(12) United States Patent
Caillot et al.

(10) Patent No.: US 9,896,065 B2
(45) Date of Patent: Feb. 20, 2018

(54) HEATING DEVICE FOR A WIPER BLADE OF A VEHICLE AND WIPER BLADE COMPRISING SAME

(71) Applicant: Valeo Systémes d'Essuyage, Le Mesnil Saint Denis (FR)

(72) Inventors: Gérald Caillot, Cernay la Ville (FR); Jean-Michel Jarasson, Le Mesnil Saint Denis (FR); Vincent Izabel, Chilly Mazarin (FR); Chantal Marquet, Brioude (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 422 days.

(21) Appl. No.: 14/323,205

(22) Filed: Jul. 3, 2014

(65) Prior Publication Data

US 2015/0013092 A1 Jan. 15, 2015

(51) Int. Cl.
*B60S 1/38* (2006.01)
*B60S 1/40* (2006.01)
*B60S 1/52* (2006.01)

(52) U.S. Cl.
CPC ........... *B60S 1/3805* (2013.01); *B60S 1/3881* (2013.01); *B60S 1/3882* (2013.01); *B60S 1/524* (2013.01); *B60S 1/3851* (2013.01); *B60S 1/3879* (2013.01); *B60S 2001/382* (2013.01)

(58) Field of Classification Search
CPC .... B60S 1/3851; B60S 1/3805; B60S 1/3879; B60S 1/3882
USPC ............. 15/250.05, 250.06, 250.07, 250.43; 219/202, 203
See application file for complete search history.

(56) References Cited

U.S. PATENT DOCUMENTS

| | | | | |
|---|---|---|---|---|
| 3,249,959 A * | 5/1966 | Theckston | ............ | B60S 1/3805 15/250.06 |
| 4,194,261 A * | 3/1980 | Parkinson | ............. | B60S 1/3805 15/250.07 |
| 5,826,293 A * | 10/1998 | Holland | ................ | B60S 1/3805 15/250.06 |
| 7,721,382 B2 * | 5/2010 | Malone | ................. | B60S 1/3805 15/250.07 |
| 8,327,496 B2 * | 12/2012 | Kim | ...................... | B60S 1/3805 15/250.05 |
| 9,003,595 B2 * | 4/2015 | Jones | ..................... | B60S 1/3805 15/250.07 |
| 9,242,621 B2 * | 1/2016 | Caillot | .................. | B60S 1/3862 |
| 9,248,808 B2 * | 2/2016 | Moll | ..................... | B60S 1/3805 |
| 2008/0000039 A1 * | 1/2008 | Higgs | .................... | B60S 1/3805 15/250.07 |
| 2008/0256738 A1 * | 10/2008 | Malone | ................. | B60S 1/3805 15/250.06 |
| 2009/0070952 A1 * | 3/2009 | Peng | ..................... | B60S 1/3805 15/250.06 |
| 2012/0005856 A1 * | 1/2012 | Jones | ..................... | B60S 1/3805 15/250.07 |
| 2012/0117746 A1 * | 5/2012 | Egner-Walter | ........ | B60S 1/3805 15/250.06 |
| 2012/0291216 A1 * | 11/2012 | Schauble | .............. | B60S 1/3805 15/250.01 |
| 2013/0193129 A1 * | 8/2013 | Jones | .................... | B60S 1/3805 219/202 |

FOREIGN PATENT DOCUMENTS

WO  WO 2011003613 A1 * 1/2011 ............ B60S 1/3805

* cited by examiner

*Primary Examiner* — Michael Jennings
(74) *Attorney, Agent, or Firm* — Osha Liang LLP

(57) ABSTRACT

The heating device is suitable for assembly with an element (3) supporting a wiper blade and comprises an element of longitudinal main axis (4) suitable for mounting inside a housing (5) of the support element (3) so as to form a spine. A heating element (13) is positioned on a bottom face of the spine-forming element (4). The spine-forming element (4) comprises at least one bushing (20) for the passage of electrical conduction means (19) in order to provide an electrical power supply for the heating element (13).

15 Claims, 2 Drawing Sheets

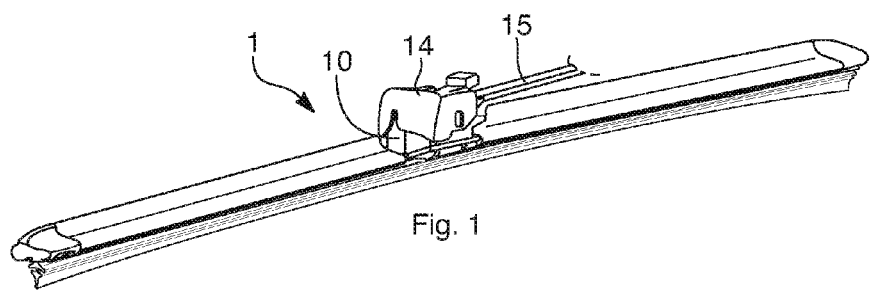
Fig. 1
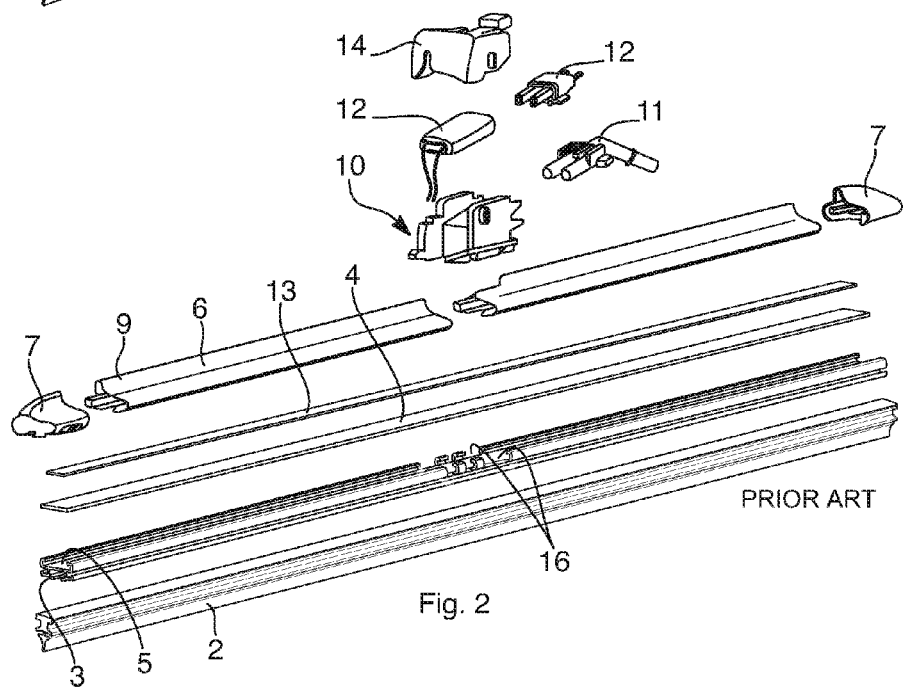
Fig. 2 PRIOR ART
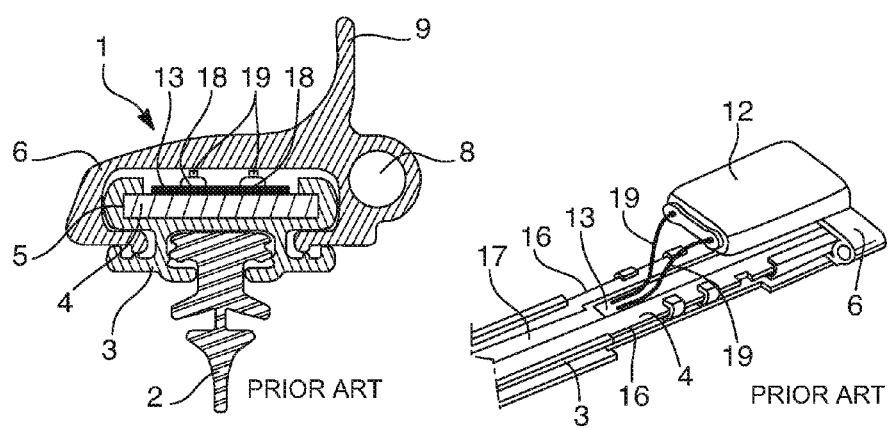
Fig. 3 PRIOR ART
Fig. 4 PRIOR ART

HEATING DEVICE FOR A WIPER BLADE OF A VEHICLE AND WIPER BLADE COMPRISING SAME

The present invention relates to a heating device for a wiper blade of a vehicle and a wiper blade comprising same.

The heating device in this kind of wiper blade comprises a heating element incorporated in the body of the wiper blade, extending over substantially the entire length thereof. By virtue of the presence of this heating element, it is possible to melt ice or snow which, during the cold period, can otherwise form or accumulate on the wiper blade and which then hampers its correct operation. This can be even more of a problem when the wiper blade is provided with a distribution manifold for a washing liquid which, in the case where it freezes, particularly in the distribution holes, prevents the liquid from existing and can, generally, make the wiper blade assembly too rigid.

The heating device of the wiper blade may comprise one or more resistive wires associated with one of the component elements of the wiper blade. The resistive wire or wires extends/extend generally all along one of these component elements.

Such a heating device is also known that comprises a resistive film incorporated in the wiper blade. The structure of such a known wiper blade is illustrated using the example shown in FIGS. 1 to 4. It is a wiper blade of the flat type, often called a flexible wiper blade or flat wiper blade. FIGS. 2 and 3 show, in an exploded view, respectively in cross section, the component elements of the wiper blade which comprise, from bottom to top, a scraping blade 2, generally made of elastomer, fixed to an elongate support element 3, generally made of a semi-rigid plastic material, an element of longitudinal main axis 4 forming a spine positioned in a housing 5 of the support element 3, and a cover element 6 fixed to the support element 3 by snap-fitting. These component elements have substantially the same length and, during the assembly of the wiper blade, an end cap 7 is fixed to each end thereof.

In the example illustrated, the cover element 6 constitutes an accessory which comprises, over a part of its length, a spraying manifold 8 for a washing liquid. The manifold 8 is provided with spraying holes (not represented). This accessory also comprises an aerodynamic baffle 9 intended to urge the scraper blade 2 with greater force against a vehicle window (not shown) or, in other words, to decrease the lift or increase the negative lift of the wiper blade.

The cover element 6 can also comprise two spraying manifolds, one along each side of the cover element.

The cover element 6 of the wiper blade 1 is in two parts of substantially the same length and linked to one another via a mechanical connector 10 which houses a hydraulic connector 11 for the washing liquid, and an electrical connector 12 linked to a heating element 13 which is in the form of a resistive film is incorporated in the wiper blade. The electrical connector consists of two parts: a part incorporated in the blade and a part incorporated in the wiper arm.

The mechanical connector 10 is outwardly closed by a link member-forming cap 14 linking it to an actuating arm 15 by an articulation (not represented). A wiping device is thus formed by the wiper blade 1, this actuating arm 15, and a motor driving the latter in a to-and-fro motion (not represented).

The support element 3 comprises, in a central area, two lateral cutouts 16 positioned facing one another. These cutouts are intended for the fixing of the mechanical connector 10 to the wiper blade during its assembly.

The spine-forming element 4 is generally made of metal and can hereinbelow be referred to simply by the term "spine". This spine plays a key role in this wiper blade since it ensures that the wiper blade assembly will have the requisite rigidity for a good mechanical strength in order to correctly distribute the bearing force of the wiper blade against a window while remaining flexible enough to adapt to the shape of the surface of the window which generally has a dished shape.

When this flexible wiper blade is raised, it takes the form of a bean, that is to say an arched shape, such that its bottom face is concave and its top face is consequently convex.

In this wiper blade with heating device, the spine 4 also has the function of conveying and distributing the heat from the heating element 13 positioned on its top face. Consequently, in a wiper blade with heating device, it is important for the spine to be made of a material that is a good heat conductor so as to be an active part of the heating device.

The heating element 13 is, in this example, in the form of a resistive film fixed to the top face of the spine-forming element 4 positioned in the housing 5 of the support element 3. The housing 5 is open towards the top over its entire length through a wide longitudinal slot 17 in which this resistive film extends. Consequently, the side areas of the top face of the spine are not covered by this resistive film.

Electrical contact points 18 provided on the resistive film immediately under the mechanical connector are linked to the electrical connector 12 via electrical conduction means which, in the example illustrated, comprise conductive wires 19 which pass through the slot 17 of the housing 5.

Instead of the conductive wires 19, it is possible to use a connection grid (called "leadframe") or else flexible skids.

The aim of the invention is to propose a heating device for a wiper blade of the same kind in which the heating element is better protected than in the wiper blade which has just been described, although its placement is optimal for the distribution of the heat towards the bottom face of the support element and towards the scraper blade while ensuring, in a simple manner, the connectivity of the heating element to the electrical connector incorporated in the mechanical connector for the link with the actuating arm.

According to the invention, the elements in the mechanical connector are not directly exposed to the heat emitted by the heating element, which reduces the risk of damaging them by excessive heat which could have an impact on the life span of the electrical connector if the heating device is often used.

One subject of the invention is a heating device suitable for assembly with an element supporting a wiper blade, the heating device comprising:

at least one element of longitudinal main axis suitable for mounting inside a housing of the support element so as to form a spine;

at least one heating element positioned on the spine-forming element;

characterized in that the heating element is positioned on a so-called bottom face of the spine-forming element, and in that the spine-forming element comprises at least one bushing for the passage of electrical conduction means in order to provide an electrical power supply for the heating element.

According to other features of the invention:

said at least one bushing is situated substantially in the central part of the spine-forming element, in the longitudinal direction thereof;

said at least one bushing is positioned set back relative to the side edges of the spine-forming element;

said at least one bushing is positioned on a side edge of the spine-forming element;

two bushings are provided in the spine-forming element, by being spaced apart from one another in the transverse and/or longitudinal direction of the spine-forming element;

two bushings are positioned on opposing side edges of the spine-forming element;

the heating element is a resistive film;

the heating element is a resistive coating;

the heating element extends over the entire width of the spine-forming element; and the heating element extends over substantially the entire length of the spine-forming element.

Another subject of the invention is a wiper blade, comprising a heating device having the features defined above;

a support element of longitudinal main axis which comprises:
 a longitudinal housing;
 means for holding a scraper blade;
a scraper blade; and
a mechanical connector suitable for linking the wiper blade to an actuating arm of a wiping device, this mechanical connector being mounted on the support element.

According to another feature of this wiper blade, the mechanical connector comprises an electrical connector to which said electrical conduction means of the heating device are linked.

According to yet another feature of this wiper blade, the mechanical connector comprises a hydraulic connector for a washing liquid.

According to yet another feature of this wiper blade, said at least one bushing of the heating device is positioned immediately under said mechanical connector. Alternatively, said at least one bushing of the heating device is positioned in proximity to said mechanical connector, outside of the area situated under said mechanical connector.

Other features and advantages of the invention will become apparent from the following description of a non-limiting embodiment of the invention, with reference to the attached figures in which:

FIG. 1, already described, is an overall view in perspective of a wiper blade linked to an actuating arm;

FIG. 2, already described, is an exploded view of a wiper blade belonging to the prior art;

FIG. 3, already described, is a cross-sectional view of the wiper blade of FIG. 2, after assembly, the heating element being placed on the top face of the spine;

FIG. 4, already described, is a schematic partial view showing the link from the heating element to an electrical connector by conductive wires;

In the figures, elements identical or equivalent to those already described with reference to FIGS. 1 to 4 will bear the same reference symbols.

FIG. 5 shows a wiper blade 1 comprising a heating device according to the invention in a cross-sectional view along the line 5A-5A of FIG. 6. The component elements of the wiper blade are the same as those of the wiper blade already described with reference to FIGS. 1 to 4 and these elements will not be described again in detail.

Figure 5:
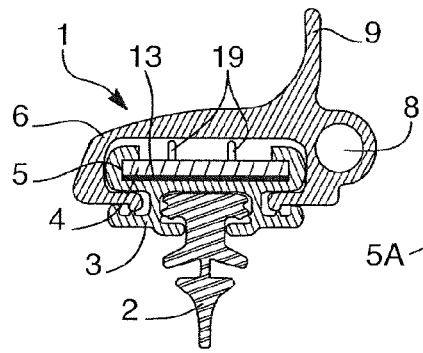
FIG. 5 is a cross-sectional view along the line 5A-5A of FIG. 6 illustrating a wiper blade comprising the heating device according to the invention in which the heating element is positioned under the spine.

The main difference compared to the heating device of the wiper blade already described lies in the fact that the heating element 13 is placed under the spine-forming element 4, and not above it. This gives the advantages of an improved downward allocation and distribution of the heat emitted by the heating element while placing the electrical connector 12 in the shelter of direct heat radiation which could cause an overheating of the connector during prolonged use.

The heating element 13 is advantageously formed by a resistive film which is well protected in the housing 5 provided in the support element 3. Obviously, this does not preclude the use of resistive wires with the same positioning in place of the resistive film or else resistive elements such as stones with positive temperature coefficient.

For the heating element, it is also possible to use a resistive coating in the form of a resistive paint or other coating deposited on the spine-forming element 4.

Now, with this advantageous placement of the heating element 13, there is a problem of connectivity at the electrical link between the heating element 13 which is located under the spine 4 and the electrical connector 12 which is located above it.

According to the invention, this connectivity problem is solved by the arrangement of at least one bushing 20 in the spine 4 for the passage of is the two conductive wires 19, or of other electrical conduction means, linking the heating element 13 to the electrical connector 12.

Given that the width of the spine 4 is relatively limited, of the order of 10 mm, and even if it is possible to effect a single bushing in the spine 4 for the passage of the two conductive wires 19, it is preferable to provide two bushings 20 therein, spaced apart from one another in the transverse and/or longitudinal direction of the spine-forming element 4.

In this way, there is no risk that the conductive wires will provoke a short circuit because of their proximity when they pass through the same bushing in a relatively restricted space.

To limit the length of the conductive wires, the bushings 20 are located immediately under the mechanical connector 10.

Figure 6:
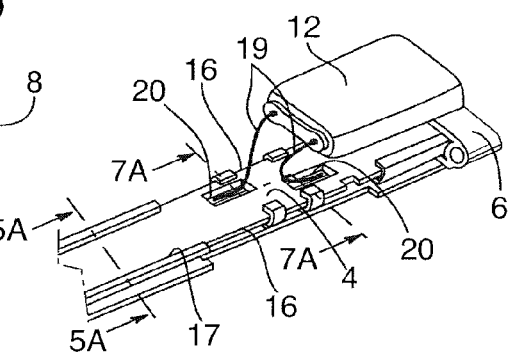
FIG. 6 is a view similar to that of FIG. 4 and which shows an embodiment for passing the conductive wires to link the heating element to the electrical connector.

FIG. 6 illustrates an embodiment with two bushings 20 positioned spaced apart from one another in the transverse and longitudinal direction and set back relative to the side edges of the spine-forming element 4.

According to a variant that is not represented, the two bushings 20 are aligned relative to one another along a longitudinal central axis of the spine-forming element 4.

Figure 7A:
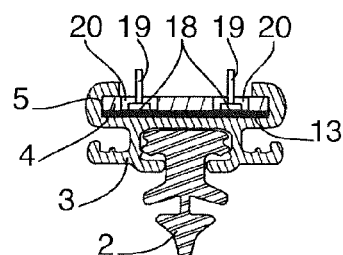
FIG. 7A is a partial cross-sectional view of the wiper blade of FIG. 5 along the line 7A-7A of FIG. 7B.
Figure 7B:
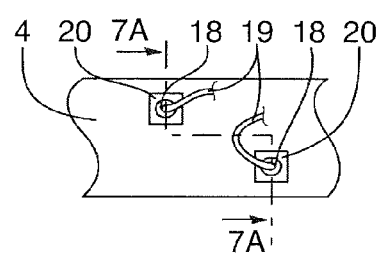
FIG. 7B is a partial plan view of the spine showing a first variant of placement of bushings in the spine for the passage of the conductive wires.

FIGS. 7A and 7B show, in a cross-sectional view, respectively plan view, the same embodiment of the bushings 20.

Figure 8A:
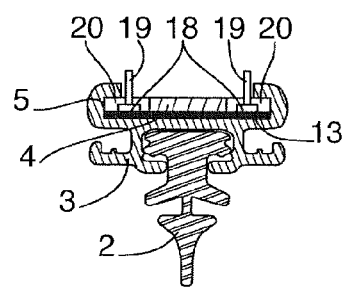
FIG. 8A is a partial cross-sectional view of the wiper blade of FIG. 5 along the line 8A-8A of FIG. 8B.
Figure 8B:
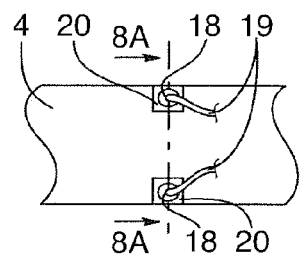
FIG. 8B is a partial plan view of the spine showing a second variant of placement of bushings in the spine for the passage of the conductive wires.

FIGS. 8A and 8B show, in a cross-sectional view, respectively plan view, a first variant of the embodiment of FIG. 6 in which each of the two bushings is positioned on a side edge of the spine-forming element, and more specifically on the opposite side edges thereof.

Figure 9A:
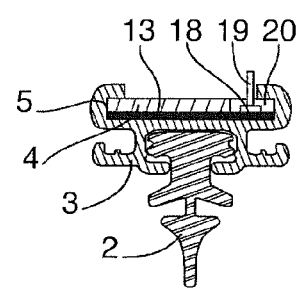
FIG. 9A is a partial cross-sectional view of the wiper blade of FIG. 5 along the line 9A-9A of FIG. 9B.
Figure 9B:
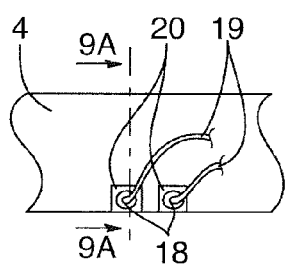
FIG. 9B is a partial plan view of the spine showing a third variant of placement of bushings in the spine for the passage of the conductive wires.

FIGS. 9A and 9B show, in a cross-sectional view, respectively plan view, a second variant of the embodiment of FIG. 6 in which the two bushings are positioned on a side edge of the spine-forming element, and more specifically on one and the same of the opposite side edges thereof.

The resistive film, which, in the example shown in FIGS. 5 to 9B, forms the resistive element 13, is advantageously fixed directly onto a bottom face of the spine-forming element, for example by a self-adhesive face provided on the film.

The resistive film 13 preferably extends over the entire width of the spine-forming element 4 and over substantially all of the length thereof.

The wiper blade comprising the heating device according to the invention advantageously forms part of a wiping device used on a vehicle.

Obviously, the invention is not limited to the examples illustrated and described, and a person skilled in the art will be able to find variants without in any way departing from the scope of the invention, particularly variants in which resistive wires or a resistive coating are used in place of the resistive film.

It should in particular be noted that the wiper blade with heating device according to the invention may also have no washing liquid distribution device or, on the contrary, may be provided with a dual distribution device, one on each lateral side of the blade. Nor is the presence of an aerodynamic baffle essential for the implementation of the invention.

The invention claimed is:

1. A wiper blade, comprising:
   a heating device configured to be assembled with a support element of the wiper blade, the heating device comprising:
      at least one spine-forming element configured to be mounted inside the support element, and
      at least one heating element positioned on the spine-forming element,
      wherein the spine-forming element comprises at least one bushing for the passage of electrical conduction means in order to provide an electrical power supply for the heating element;
   the support element having a longitudinal main axis comprising:
      a longitudinal housing,
      means for holding a scraper blade, and
      a scraper blade; and
   a mechanical connector mounted on the support element and configured to link the wiper blade to an actuating arm of a wiping device.

2. The wiper blade according to claim 1, wherein the mechanical connector comprises an electrical connector to which said electrical conduction means of the heating device are linked.

3. The wiper blade according to claim 1, wherein the mechanical connector comprises a hydraulic connector for a washing liquid.

4. The wiper blade according to claim 1, wherein said at least one bushing of the heating device is positioned immediately under said mechanical connector.

5. The wiper blade according to claim 1, wherein said at least one bushing of the heating device is positioned in proximity to said mechanical connector, outside of an area situated under said mechanical connector.

6. The wiper blade according to claim 1, wherein the at least one heating element is positioned on a bottom face of the spine-forming element.

7. The wiper blade according to claim 1, wherein said at least one bushing is situated substantially in a central part of the spine-forming element, in the longitudinal direction thereof.

8. The wiper blade according to claim 1, wherein said at least one bushing is positioned set back relative to side edges of the spine-forming element.

9. The wiper blade according to claim 1, wherein said at least one bushing is positioned on a side edge of the spine-forming element.

10. The wiper blade according to claim 1, wherein two bushings are provided in the spine-forming element, by being spaced apart from one another in a transverse and/or longitudinal direction of the spine-forming element.

11. The wiper blade according to claim 1, wherein two bushings are positioned on opposing side edges of the spine-forming element.

12. The wiper blade according to claim 1, wherein the at least one heating element is a resistive film.

13. The wiper blade according to claim 1, wherein the at least one heating element is a resistive coating.

14. The wiper blade according to claim 1, wherein the at least one heating element extends over an entire width of the spine-forming element.

15. The wiper blade according to claim 1, wherein the at least one heating element extends over substantially an entire length of the spine-forming element.

* * * * *

UNITED STATES PATENT AND TRADEMARK OFFICE
CERTIFICATE OF CORRECTION

PATENT NO. : 9,896,065 B2
APPLICATION NO. : 14/323205
DATED : February 20, 2018
INVENTOR(S) : Gérald Caillot et al.

Page 1 of 1

It is certified that error appears in the above-identified patent and that said Letters Patent is hereby corrected as shown below:

On the Title Page

Under item (65) Prior Publication Data, Line 2, insert item -- (30) Foreign Application Priority Data July 30, 2013 (FR) 1356487 --.

Signed and Sealed this
Eleventh Day of June, 2019

Andrei Iancu
*Director of the United States Patent and Trademark Office*